United States Patent [19]

Mathis

[11] Patent Number: 4,726,644

[45] Date of Patent: Feb. 23, 1988

[54] RF FREQUENCY MULTIPLEXED FIBER OPTIC DATA BUS

[75] Inventor: Ronald F. Mathis, San Diego, Calif.

[73] Assignee: General Dynamics Electronics Division, San Diego, Calif.

[21] Appl. No.: 752,735

[22] Filed: Jul. 8, 1985

[51] Int. Cl.[4] .......................... G02B 6/28; H04B 9/00; G02F 1/00

[52] U.S. Cl. ........................ 350/96.16; 350/96.15; 370/1; 370/3; 455/602; 455/610; 455/612

[58] Field of Search ............... 350/96.15, 96.16; 455/610, 612, 602; 370/1, 3

[56] References Cited

U.S. PATENT DOCUMENTS

| | | | |
|---|---|---|---|
| 3,676,684 | 7/1972 | DeLange | 455/600 X |
| 4,061,577 | 12/1977 | Bell | 350/96.21 |
| 4,267,590 | 5/1981 | Bosotti | 370/3 X |
| 4,358,851 | 11/1982 | Scifres et al. | 350/96.15 |
| 4,553,101 | 11/1985 | Mathis | 370/3 X |
| 4,577,924 | 3/1986 | Mathis | 350/96.15 |

Primary Examiner—William L. Sikes
Assistant Examiner—Brian M. Healy
Attorney, Agent, or Firm—Brown, Martin, Haller & Meador

[57] ABSTRACT

A fiber optic data bus that includes a multiplexer means for generating a plurality of optical signals and for intensity modulating each of the optical signals in response to a respective one of a plurality of input RF signals each at a different RF carrier frequency to provide a plurality of intensity modulated optical signals. A signal collection means combines the plurality of intensity modulated optical signals into a combined optical signal. A conducting means conducts the combined optical signal to a signal distribution means which distributes the combined optical signal to each of a plurality of output ports. A demultiplexer means extracts from a portion of one of the distributed combined optical signals an output RF signal substantially identical to a predetermined one of the plurality of RF input signals.

15 Claims, 17 Drawing Figures

RF FREQUENCY MULTIPLEXED FIBER OPTIC DATA BUS

CROSS-REFERENCE TO RELATED APPLICATIONS

This application is related to applicant's co-pending U.S. patent application Ser. No. 688,271 filed Jan. 2, 1985, now U.S. Pat. No. 4,577,924, entitled "Optical Recursive Filter", which is a continuation of Ser. No. 384,186 filed June 3, 1982, now abandoned; and applicant's co-pending U.S. patent application Ser. No. 525,162 filed Sept. 21, 1983, now U.S. Pat. No. 4,553,101 entitled "Fast Frequency Hopping Demodulation System with Serial Accumulation of Signal".

BACKGROUND OF THE INVENTION

1. Field of the Invention

The present invention relates to optical data busses. More specifically the present invention relates to a novel and improved optical data bus utilizing a plurality of small, lightweight optical RF bandpass filters each for extracting a particular input signal from a composite signal comprised of all input signals.

2. Background Art

Future tactical data links, including data busses, electronic intelligence collection systems and high resolution radar receivers demand high performance, large time-bandwidth product devices for signal processing. Fiber and integrated optics technologies promise to provide versatile and effective signal processing techniques with bandwidths and time-bandwidth products exceeding those of any other technology currently envisioned. Other potential benefits include low power requirements, reduced size, weight, cost, complexity and reduced sensitivity to electromagnetic interference, electromagnetic pulse and nuclear radiation. Another potential benefit especially with respect to an optical data bus is the virtually unlimited expansion capability, limited only by the number of input RF carrier frequencies and the assigned bandwidths associated with each carrier frequency.

Previous attempts at constructing fiber optic RF frequency multiplexed data buses have attempted to use different optical carrier frequencies for the multiplexing. In implementing such a system, multiple optical carrier frequencies must be generated in which a series of complex filters, polarization discriminators, and modulators are used to generate the combined multiplexed signal for transmission over a single optical fiber. The demodulating scheme includes polarization discriminators, filters, and detectors for isolating the different modulated carrier signals and detecting the modulation on each carrier signal. These systems have the inherent disadvantage that a plurality of different optical carriers must be generated. Another disadvantage of these systems is that a great number of components must be utilized to achieve a working system thereby resulting in significant increases in cost, size, and weight.

With respect to optical filters used in optical systems, it is known to construct a segment of optical fiber which is resonant to the optical or carrier frequency by placing highly reflecting mirrors on both ends of the fiber and injecting light of appropriate characteristics into the fiber. A fiber segment so configured may be referred to as a resonant cavity with respect to the carrier frequency. This resonant cavity has been described as being useful for the determination of coupling coefficients so as to enable one to specify and predict the light transmission characteristics of a particular fiber. This test assumes the use of a multimode fiber segment where the coupling coefficients between at least two light propagating modes are simultaneously at resonance within the fiber segment when measured. However, it has not been suggested prior to applicant's above-referenced co-pending application entitled "Optical Recursive Filter" that a multimode optical fiber functioning as a resonant cavity may be employed, with its attendant advantages relating to cost, size, weight and reduced susceptibility to external interference, as an RF bandpass filter, especially with respect to an RF frequency multiplexed optical data bus.

SUMMARY OF THE INVENTION

The present invention is a fiber optic data bus having a multiplexer means for generating a plurality of optical signals and for intensity modulating each one of the optical signals in response to a respective one of the plurality of input RF signals to provide a plurality of intensity modulated optical signals. Signal collection means combine the plurality of intensity modulated optical signals into a combined optical signal which is provided through a conducting means to a signal distribution means which ultimately distributes the combined optical signal to a plurality of output ports. Demultiplexer means is then used to extract from a portion of one of the distributed combined optical signals an output RF signal substantially identical to a predetermined one of the plurality of input RF signals.

In another embodiment of the invention the demultiplexer means extracts from a portion of each distributed combined optical signal a different one of a plurality of output RF signals each substantially identical to a respective one of the plurality of input RF signals.

BRIEF DESCRIPTION OF THE DRAWINGS

The objects, advantages and features of the present invention will be more fully apparent from the detailed description set forth below, taken in conjunction with the accompanying drawings in which like reference characters correspond throughout and wherein.

DESCRIPTION OF THE PREFERRED EMBODIMENTS

Figure 1:
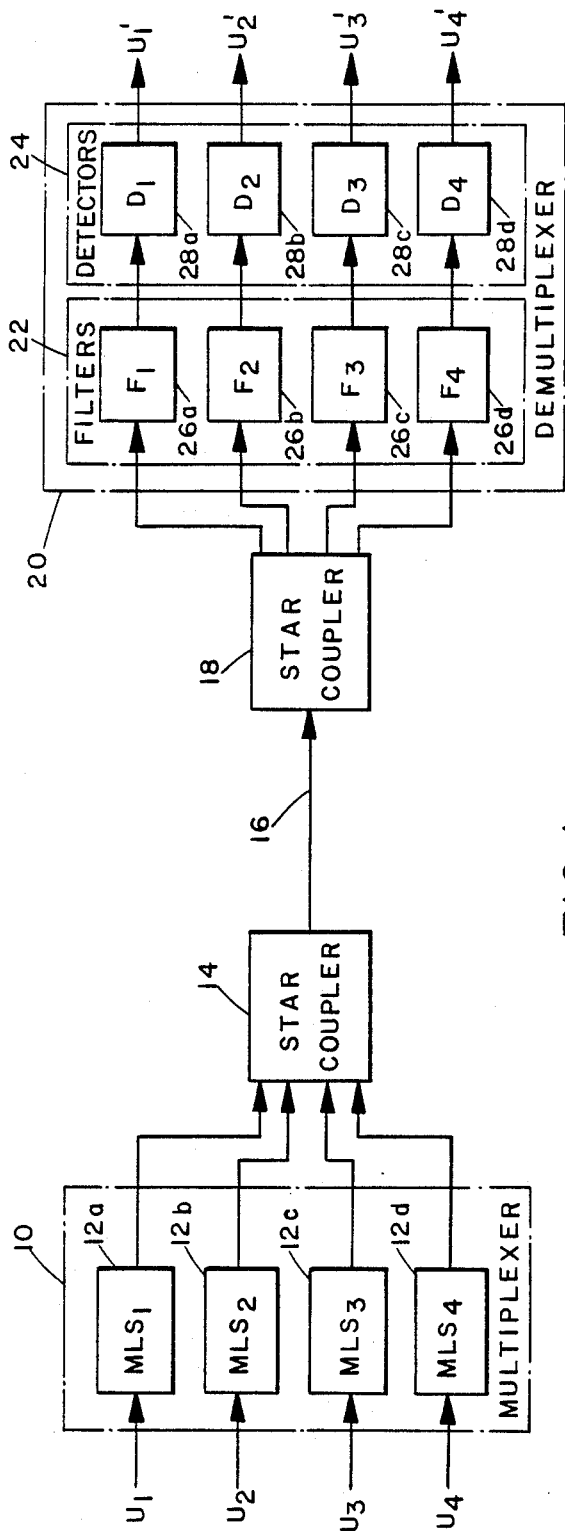
FIG. 1 is a schematic block diagram of the RF frequency multiplexed fiber optic data bus of the present invention.

FIG. 1 illustrates a simplified RF frequency multiplexed fiber optic data bus of the present invention. A plurality of input RF signals, $U_1$-$U_4$, are provided as an input to multiplexer means 10. Each input RF signal contains information or data modulated on an RF carrier having a carrier frequency typically in the range of 100 MHz-10 GHz. The information may be either amplitude modulated, frequency modulated or modulated by other well known modulation techniques. The modulated information may be either analog information or digital information that has a predetermined bandwidth centered about a respective RF carrier frequency. As with all multiplexer systems, the carrier frequencies must be spaced sufficiently far apart in the frequency spectrum to prevent any overlapping of one bandwidth about a carrier frequency with another bandwidth of an adjacent carrier frequency.

Multiplexer means 10 is comprised of a plurality of modulated light sources 12a-12d which each generate an optical signal, receive a respective one of the input RF signals and providing an output optical signal intensity modulated by the input RF signal. Modulated light sources 12a-12d may each be implemented as a laser diode, for example GaAs laser diode having an optical carrier wavelength of 0.84 μm. Each modulated light source may have the same or different optical wavelengths. The output of each modulated light source 12a-12d is coupled by means such as an optical fiber to the input of a signal collection means.

The signal collection means is comprised of a star coupler 14 which combines the optical signal provided from each modulated light source into a single combined optical signal. Although each modulated light source 12a-12d may provide a coherent optical signal output, these signals typically become noncoherent signals once coupled into multimode fiber by star coupler 14. The output of star coupler 14 is coupled by a coupling means typically multimode optical fiber 16 to the input of a signal distribution means.

The signal distribution means comprises star coupler 18 which is provided with a plurality of output ports for further distribution of the combined signal. In effect, star coupler 18 functions as a power divider so as to distribute substantially equal signal power to each of the output ports.

The output ports of star coupler 18 are coupled by typically an optical fiber into demultiplexer means 20. Demultiplexer means 20 extracts from a portion of each distributed combined optical signal an optical output signal having a wavelength corresponding to the modulation frequency of an input RF carrier signal. Demultiplexer means 20 then converts each output optical signal into an electrical output RF signal corresponding to a respective one of the input RF signals.

Demultiplexer means 20 is comprised of signal isolation means 22 and converting means 24. Signal isolation means 22 extracts the intensity modulated signal from portions of the combined optical signal and provides a plurality of optical output signals. Signal isolation means 22 is comprised of a plurality of optical bandpass filters 26a-26d each having an input coupled by means such as an optical fiber to the output of star coupler 18. Each filter 26a-26d is tuned to pass a predetermined RF frequency and bandwidth in an output optical signal corresponding to the RF frequency and bandwidth of the intensity modulation frequency of an input RF signal. Each filter 26a-26d thus has a predetermined passband of RF frequencies about the resonant frequency. A more detailed discussion of the operation of the filters is presented below.

Demultiplexer means 20 further includes converting means 24 for converting each output optical signal into an electrical signal. Converting means 24 comprises a plurality of detectors 28a-28d each having an input respectively coupled to the output of a respective one of filters 26a-26d by means such as an optical fiber. Detectors 28a-28d are typically well known photodetectors such as a PIN detector or an APD (avalanche photodiode) detector. The output of each detector is an output RF signal substantially identical to a respective one of the input RF signals. Each filter-detector pair, for example filter 26a and detector 28a isolate and extract an output optical signal from the combined optical signal, which is converted from the optical frequency spectrum to the RF spectrum as an output signal $U'_1$ corresponding to the input RF signal $U_1$.

Figure 2:
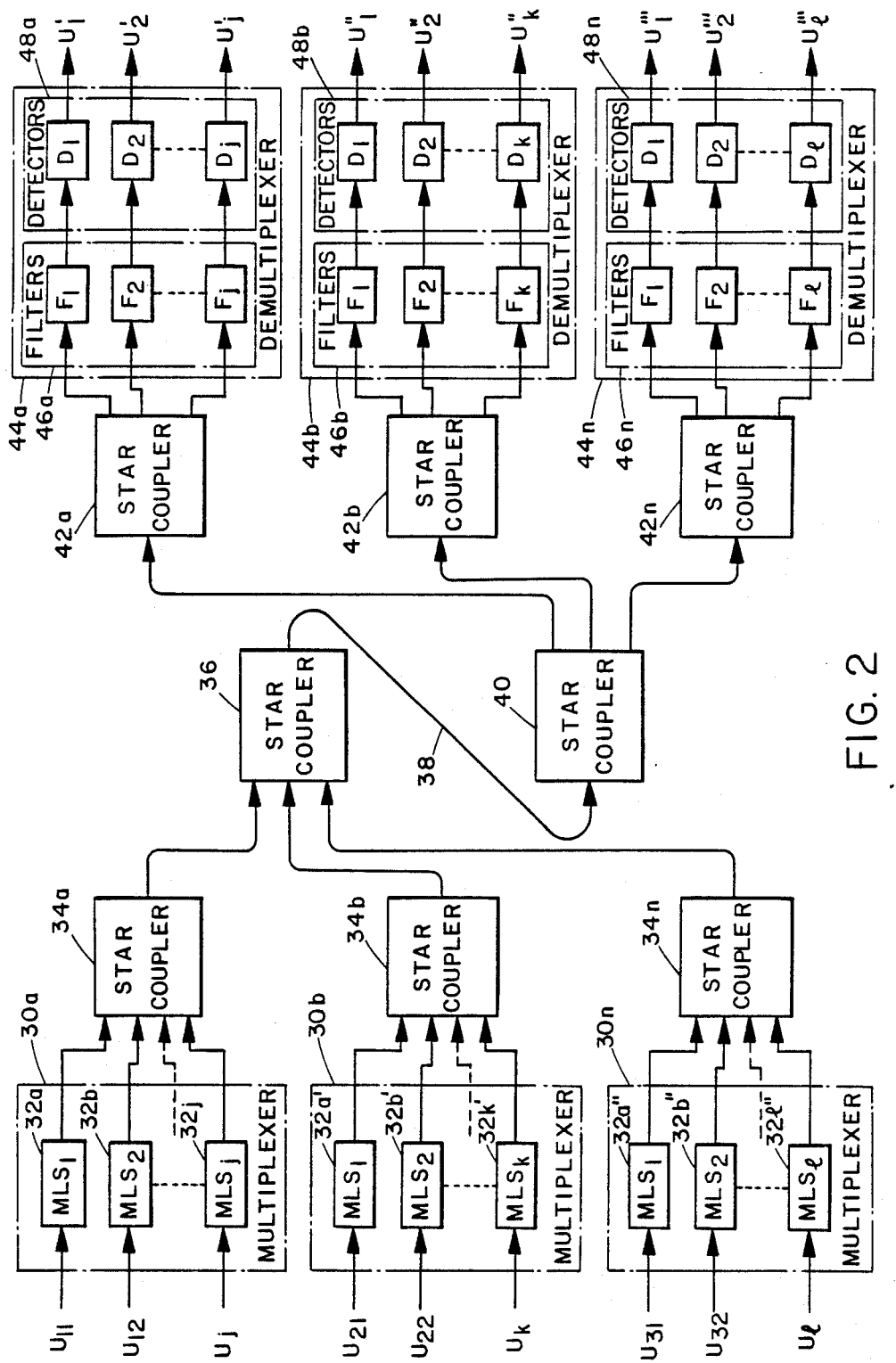
FIG. 2 is a schematic block diagram of an expanded data bus system FIG. 1.

FIG. 2 illustrates an expanded version of the fiber optic data bus of the present invention. In FIG. 2, a plurality of multiplexers means 30a-30n each receive a plurality of input RF signals. For example, multiplexer means 30A includes a plurality of modulating light sources 32a-32j each were receiving an input RF signal, $U_{11}$-$U_j$, each modulated about a different RF carrier frequency. The remaining multiplexer means 30b-30n similarly receive different input RF signals each being modulated upon a different RF carrier frequency. The output from each modulated light source 32a-32n is coupled by means such as optical fiber into a star coupler 34a-34n associated with the respective multiplexer means. Similarly, the output from star couplers 34a-34n is coupled by means such as an optical fiber to star coupler 36. While star couplers 34a-34n each combine the intensity modulated optical signals provided by a respective multiplexer means, star coupler 36 combines each of the combined signals provided from star couplers 34a-34n into a single signal. The combined signal output from star coupler 36 is coupled on optical fiber 38 to star coupler 40. Star coupler 40 distributes the combined signal with a corresponding reduction in power for each distributed combined signal to a plurality of star couplers 42a-42n.

Each star coupler 42a-42n provides a plurality of outputs to a respective demultiplexer means 44a-44n. Each demultiplexer means 44a-44n includes signal isolation means 46a-46n respectively coupled to converting means 48a-48n. Each signal isolation means, for example, signal isolation means 48a is comprised of a plurality of optical bandpass filters 48a-48j each having an input coupled to a different output port of star coupler 42a. Furthermore, converting means 48a is comprised of a plurality of detectors 50a-50j, each having an input coupled to the output of a corresponding filter.

Demultiplexer means 44 extracts from a portion of the combined optical signal a plurality of output RF signals each corresponding to a predetermined one of the input RF signals. Each of the detectors provides an electrical signal that is proportional to the intensity of the light passing through the filter so as to provide an output electrical signal proportional to the amplitude of the modulation of the internal signal.

Figure 3:
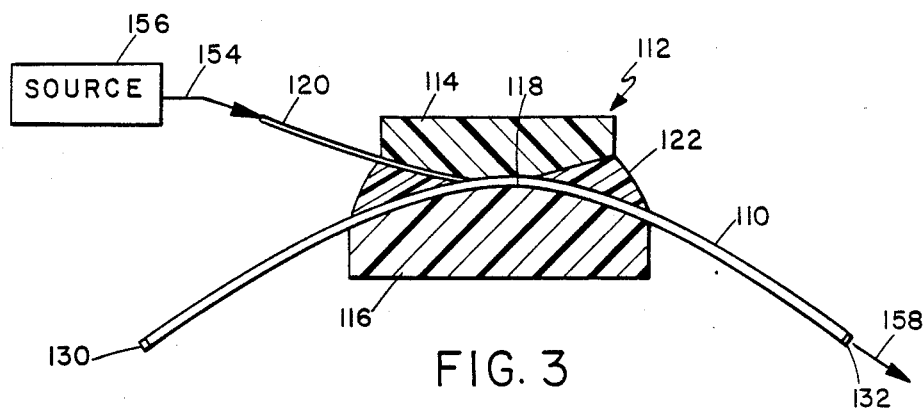
FIG. 3 is a schematic sectional view of one embodiment of a single optical bandpass filter in accordance with the present invention.
Figure 4:
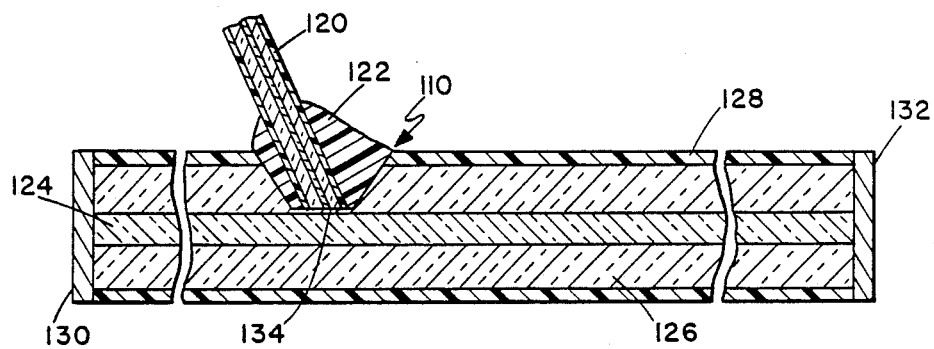
FIG. 4 is an enlarged partial sectional view of the optical filter of FIG. 3.

Referring to FIGS. 3–6 and 12, the physical structure of the optical RF bandpass filter is shown. In FIGS. 3 and 4, the multimode optical fiber segment 110 is mounted in a directional coupler device 112 comprising coupler elements 114 and 116. Fiber segment 110 is formed over surface 118 of coupler element 114 and input fiber 120 is clamped in position with respect to fiber segment 110 by means of coupler element 116. Coupler device 112 and fibers 110 and 120 are held together by suitable means such as epoxy 122. FIG. 4 shows fiber segment 110 comprised of core 124 surrounded by cladding 126 which is enclosed by buffer layer 128. Reflective coating or mirror 130 and 132 are applied by appropriate means such as deposition after the ends of fiber segment 110 has been ground flat and polished.

By way of example, fiber segment 110 may be a step index fiber with a silica core, having a diameter in the range of 200–1000 μm, and contained within a doped silica cladding. A fiber buffer layer made of a material capable of withstanding the requirements of deposition, that is, having heat-resistance characteristics up to 250° C., encases the cladding. It has been found that when properly applied, a buffer or jacket made of polytetrafluoroethylene (PTFE) is adequate. A metal, such as aluminium, deposited on the cladding also may serve as an adequate buffer layer. The buffer layer is necessary to protect the silica glass fiber from moisture and scratches which reduce the tensile strength of the fiber. A reduction in tensile strength reduces the effective flexibility of the fiber which may cause the fiber to break easily. The types of fibers utilized in the present invention are well known in the art and are commercially available. The reflectance of the dielectric mirror is typically in the vicinity of 0.998 and the transmittance is in the vicinity of 0.001.

In constructing the directional coupler of FIG. 3, the cladding of the main fiber 110 is ground to within a very short distance of core 124, for example, 2 μm, and the end of signal injection fiber 120 is applied to fiber segment 110 at location 134. Of course, sizes, materials and specific parameters provided herein are examples only and the invention is not to be limited by these examples.

Figure 5:
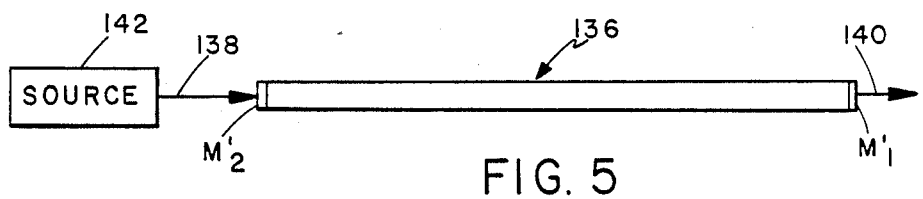
FIG. 5 is a schematic representation of an alternative embodiment of the optical bandpass filter.
Figure 6:
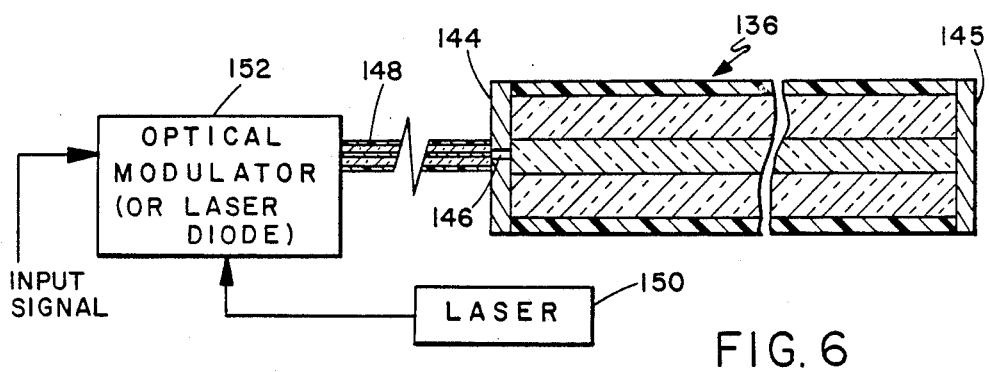
FIG. 6 is an enlarged partial schematic, partial sectional view of the filter of FIG. 5.

An alternative and preferred embodiment of the filter used in the present invention is shown in FIG. 5. FIG. 5 illustrates by schematic representation fiber segment 136 having input light (combined optical signal) represented by arrow 138 and output light (output optical signal) represented by arrow 140. Source 142 is generically defined as the system which generates the optical signal from an input RF signal. Referring to FIG. 6, fiber segment 136 is formed with mirrors 144, and 145 at opposite ends with one mirror, for example, mirror 144, having an axial hole 146 therethrough. Hole 146 may be formed by chemical etching or laser burning. The hole typically has a diameter in the range of 50–150 μm for an exemplary fiber core of 1000 μm diameter or typically in the range of 5–15% of the core diameter. Light is injected into fiber segment 136 by means of an optical waveguide or single mode fiber 148 coupled to an appropriate light source such as laser 150, the output of which may be modulated by modulator 152. In the alternative, the modulator output may be directly coupled to the fiber segment 136. A laser diode may be used as the modulating laser source instead of laser 150 ns mosulroe 152. It should be noted that although the carrier light injected by means of fiber 148 may be coherent, upon passing through hole 146 in mirror 144 and entering multimode optical fiber 136, diffraction of the light will occur, resulting in multimodal propagation of the light in fiber segment 136. It has been discovered that when the hole is placed on the central axis of the core some coherency remains in the propagated light. However when the hole is placed off-axis, but within the boundary of the core-cladding interface, the injected light becomes non-coherent.

In both the embodiments of the filter described above, fiber segments 110 and 136 each have a length L corresponding to half the wavelength λ of the modulation frequency in that fiber. Referring to FIG. 3, light input, as represented by arrow 154, from source 156 applied to input fiber 120 enters fiber segment 110 through directional coupler 112. Light exits through partially reflecting mirror 132 as represented by arrow 158. By making the length of fiber 110 equal to half the modulation wavelength, fiber segment 110 functions as a resonant cavity. Fiber segment 110 is not resonant to the optical carrier but only to the modulation on the carrier. The light injected and represented by arrow 154 in FIG. 3 and by arrow 138 in FIG. 5 may be coherent if applied directly from a coherent light source but becomes noncoherent when in the fiber. Both fiber segments 110 and 136 are multimode optical fibers, hence both embodiments exhibit multimodal propagation of the light in the resonant cavity.

The 3-dB bandwidth, Δf, is given by the equation:

$$\Delta f = \frac{f_c}{\pi \sqrt{A}} \left[ 1 - A + \frac{2}{3} A \left( \frac{\pi \Delta}{2 + \Delta} \right)^2 \right] \quad (1)$$

where $$\Delta = \frac{1}{2} \left[ 1 - \left( \frac{\eta_2}{\eta_1} \right)^2 \right] \quad (3)$$

In equations (1) and (2):
$f_c$ is the center modulation frequency, $A = R_1 R_2 (1 - l^1)$,
$R_1$ is the reflectance of mirrors 130 and 144,
$R_2$ is the reflectance of mirrors 132 and 145,
$l^1$ represents the total losses in the cavity fiber,
$\eta_1$ is the refractive index of fiber core 21, and
$\eta_2$ the refractive index of fiber cladding 22.

The signal attenuation loss $l_t$ in dB is given by the equation:

$$l_t = -20 \log \frac{\alpha \beta}{(1 - A \sin \omega_c \gamma / \omega_c \gamma)} \quad (3)$$

where:
α is the fraction of light taken for the output ($\alpha \leq 1 - R_1$),
β is the loss at the coupling input, frequently termed the launch coupler, $$\omega_c = 2\pi f_c, \text{ and}$$

$$\gamma = \frac{\Delta}{(2+\Delta)} f_c$$

Signal attenuation values less than 10 dB are possible, implying a 5 dB loss in the bias intensity.

Figure 7:
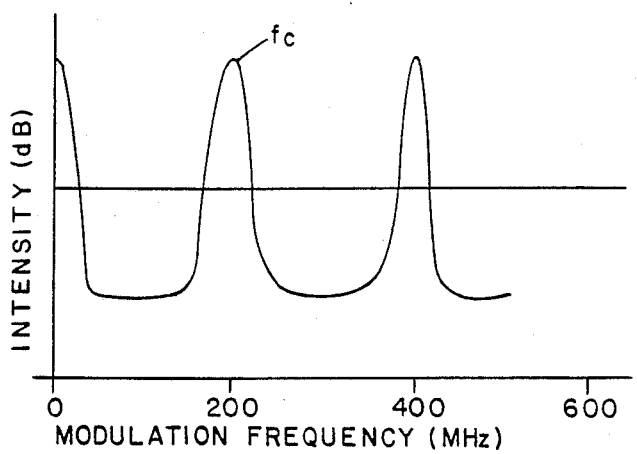
FIG. 7 is a plot of output intensity versus modulation frequency for a typical filter.
Figure 8:
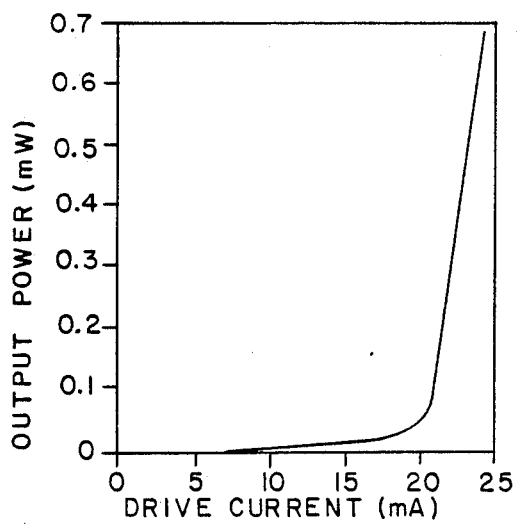
FIG. 8 is a graph of output power versus drive current for a typical laser diode which may be employed in the present invention.

A filter constructed in accordance with the principles as discussed herein, specifically a filter employing a fiber segment 50 cm long, performs substantially as shown in the diagram of FIG. 7. The peak at 200 MHz is the fundamental center modulation frequency $f_c$. The other peaks shown are integer harmonics of the fundamental frequency. Once again, the light input to the fiber segment is intensity modulated, i.e., power modulated, as distinguished from amplitude modulated light. In the exemplary filter, it is expected that the 3-dB bandwidth be a few tenths of a percent (0.5%) of the center frequency, resulting in a Q of about 200 where $Q = f/\Delta f$, can be achieved. The results shown in FIG. 7 are consistent with calculated values when $$L = \frac{\lambda}{2} = \frac{c}{2\eta f_c} \quad (4)$$

where:

L is the length of the fiber segment,
c is the speed of light ($3 \times 10^8$ m/sec), and
$\eta$ is the effective refractive index and is taken as 1.5 in this example. From equation (4) it may be calculated that L equals 0.5 m or 50 cm for the exemplary filter.

Filter performance as a function of key parameters for the RF bandpass filter of this invention is represented in the graphs of FIGS. 8–11. For example, a single laser diode may be employed as source 156 and 142 from which the light output is modulated prior to injection into the filter of FIGS. 3 or 5. Laser diodes are a readily available commercial product typically having a power versus current curve similar to the one illustrated in FIG. 8. The curve of FIG. 8 indicates that modulation about a DC bias level of approximately 23 mA (0.36 mW), with a modulating current of about 1 mA peak-to-peak, is preferred. A DC bias level of 23 mA ensures that the intensity waveform has a bias level such that the intensity modulation always remains above zero intensity.

Figure 9:
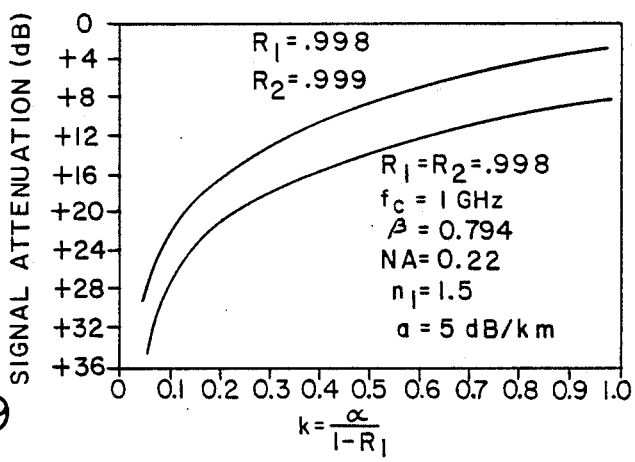
FIG. 9 is a graph of insertion loss with respect to a value which is a function of output and the reflectance of the output mirror.

Signal attenuation is represented in FIG. 9 for different relationships of the reflectances of mirrors 130, 132, 144 and 145. In FIG. 9 signal attenuation is given as a function of:

$$K = \frac{a}{1 - R_1} \quad (5)$$

where:

$a$ is fraction of light taken for the output ($a \leq 1 - R_1$) and $R_1$ is the reflectance of the output mirror.

Ideally, it would be desirable to have $k = 1$ which implies that all of the energy not reflected by the output mirror is collected at the output. In practice, of course, some of the light will be absorbed by the dielectric material of the mirror. A practical value for k with dielectric mirrors is in the range of 0.7 to 0.8 for $R_1 = 0.999$. However, it should be noted that when $R_1$ is much smaller than $R_2$ ($R_1 << R_2$) the signal attenuation is 6 dB less than when $R_1 = R_2$. In this case, while in absolute terms it appears to be a very small difference, 0.998 is indeed much less than 0.999. The other parameters which were held constant for this measurement are shown in the FIG. 9 graph. The other parameters in FIG. 9 are the modulation frequency, $f_c$; the launch coupler loss, $\beta$; the numerical aperture, NA; the effective refractive index of the fiber, $\eta_1$ and the characteristic fiber attenuation, a.

Figure 10:
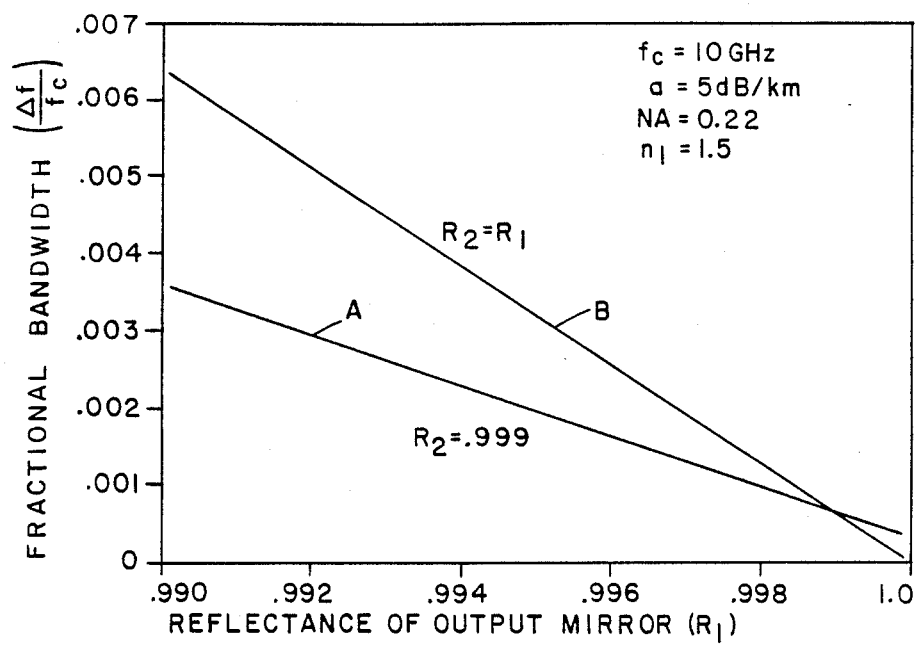
FIG. 10 is a graph of fractional bandwidth with respect to output mirror reflectance.

Fractional bandwidth as a function of reflectivity of the output mirror is shown in FIG. 10. As illustrated the bandwidth of the linear configuration filter is not explicitly dependent upon the fraction of output light $a$. In conformance with FIG. 9, the advantage of having the output mirror at a lower reflectivity than the opposite mirror ($R_1 < R_2$) is apparent. This is shown by the fact that curve A has a fractional bandwidth less than curve B for all values of $R_1$ less than $R_2$.

Figure 11:
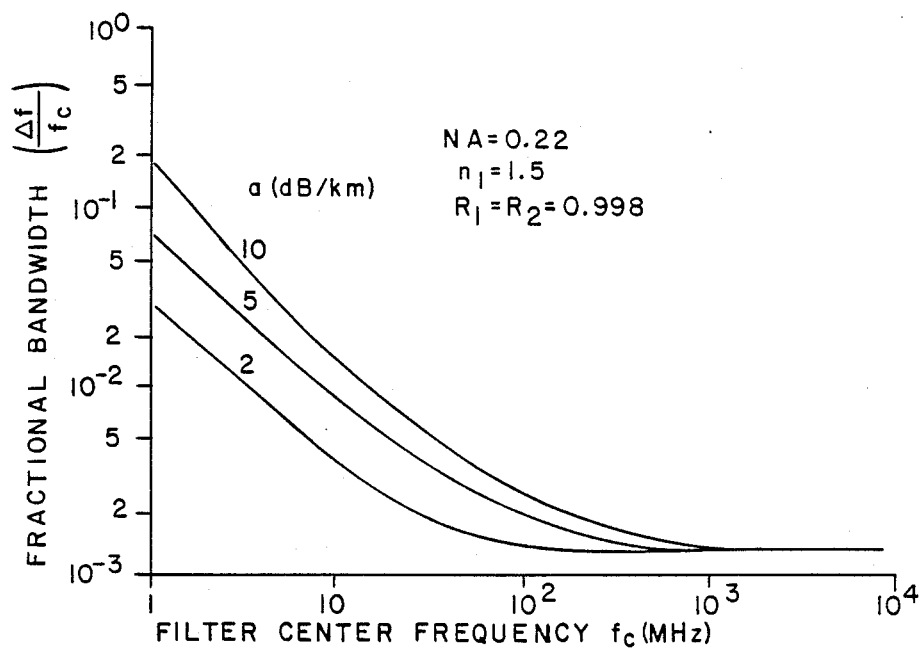
FIG. 11 is a graph of fractional bandwidth with respect to filter center frequency.

Fractional bandwidth as a function of filter center frequency, for different values (10, 5, 2) of the characteristic fiber attenuation, a, is shown in FIG. 11. FIG. 11 is plotted with reflectances $R_1 = R_2 = 0.998$. At frequencies of approximately 1,000 MHz, and greater all of the fibers behave similarly with respect to fractional bandwidth. The degraded fractional bandwidths at the lower frequencies result from fiber transmission losses and dispersion. FIG. 11 illustrates that the fractional bandwidth for a fiber having an attenuation of a=10 dB/km is substantially worse than where a=2 dB/km. The shapes of the curves in FIG. 11 are relatively similar for different values of reflectance but larger reflectances result in larger frequencies at which the effects of the fiber transmission losses and dispersion become important. This is consistent with the fact that larger reflectances result in larger effective path lengths for the light in the fiber.

In comparing the present noncoherent filter with a coherent optical RF bandpass filter, e.g. a filter which does not use a multimode optical fiber and employs coherent light, it has been found that the bandwidth of the coherent device with respect to the optical carrier frequency is very narrow and the filter has extreme sensitivity to variations in fiber length. In addition, a filter operating with coherent light is very sensitive to small temperature changes which effect the filter center operating frequency $f_c$.

In the noncoherent filter used in the present invention, fiber length variations which might be expected as a result of temperature changes do not significantly affect the operation of the device unless the fractional bandwidth approaches or falls below 0.1%. In the noncoherent filter, side optical bandwidth operation is preferred while narrow bandwidth is necessary for the device operating with coherent light. The option of wide bandwidth which may be tailored to a narrow bandwidth gives the optical filters used in the present invention greater flexibility in matching the bandwidth of an RF input signal. The tailoring of the bandwidth is discussed herein with reference to FIGS. 12 and 13.

For a coherent filter, the optical modulator must have an output intensity proportional to the square of the signal amplitude. This is not a common or presently available device. In the noncoherent filter used in the present invention, output intensity need only be linearly proportional to the signal amplitude which is the common operation for an optical modulator. An advantage of coherent operation is that a hole in the input mirror is not required, however, precise control of fiber length caused by thermal and mechanical perturbations is critical. Because the noncoherent filter is concerned with the frequency and wavelength of the modulation, as opposed to the carrier light, either the directional coupler of FIG. 3 or the axial coupler shown in FIG. 5 may be utilized. With the noncoherent filter dynamic control of fiber length is not required.

Figure 12:
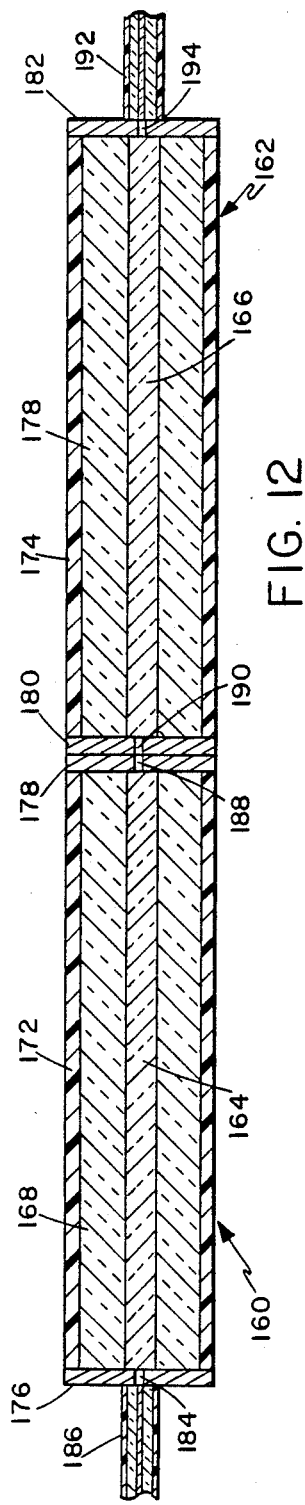
FIG. 12 is a schematic sectional view of a pair of series coupled optical bandpass filters.

It has been experimentally determined that coupling a pair of optical bandpass filters in series as illustrated in FIG. 12, a narrower passband may be achieved. FIG. 12 illustrates an embodiment of a pair of optical bandpass filters 160 and 162 each respectively tuned to the same RF carrier frequency. Filters 160 and 162 respectively include cores 164 and 166 encased by claddings 168 and 170. Claddings 168 and 179 are further enclosed by buffer layers 172 and 174. Both filters 160 and 162 are constructed from multimode optical fibers. Filter 160 includes mirror 176 at one end while at the other end is located mirror 178. Similarly, filter 162 includes mirrors 180 at one end while at the other end is located mirror 182. As illustrated in FIG. 12, filters 160 and 162 are mated together with the external surfaces of mirrors 178 and 180 in contact. Filter 160 includes an axial hole 184 in mirror 176 in which light may be coupled into core 164 from fiber 186. Again, hole 184 may be located off the central axis of core 164 within the boundary defined by the core/cladding interface so as to insure coherent injected light is propagated throughout the filter as noncoherent light. At the other end of filter 160 in mirror 178 is axial hole 188 which is axial aligned with hole 190 in mirror 180 of filter 162. The aligned holes 188 and 190 permit enhanced coupling of the filtered signal from filter 160 to filter 162 without significant losses in power or degradation in filter performance. It is preferred that holes 188 and 190 are of the same diameter and slightly larger in diameter than hole 184 at the input of the filter 160.

The light input to filter 160 is filtered so as to output to filter 162 light modulated in the passband of filter 160. Filter 162 filters the light within the passband of filter 162 which is then output to optical fiber 192 at hole 194 in mirror 182.

Figure 13B:
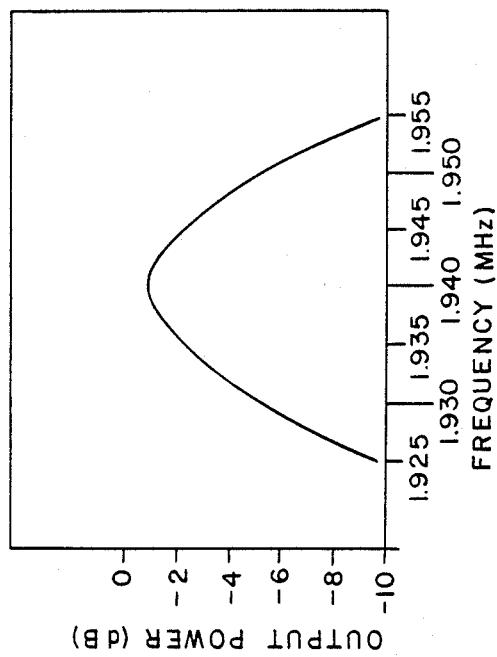
FIGS. 13(a)-(b) are graphs of the signal power input and output from the bandpass filters with respect to frequency for a single bandpass filter and two cascaded bandpass filters.
Figure 13A:
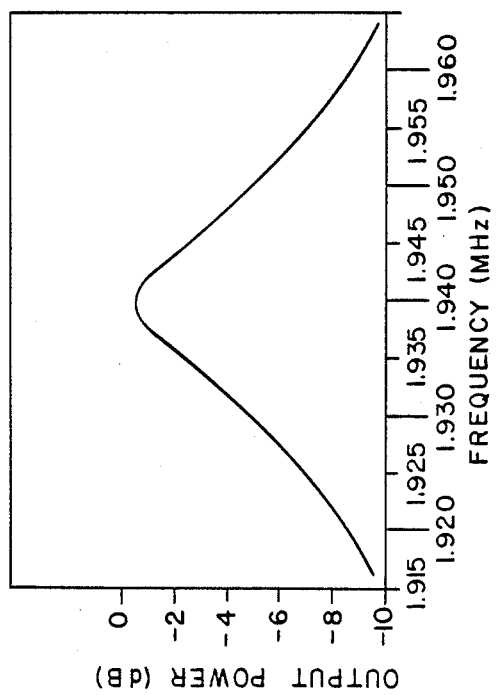

FIG. 13 illustrates the passband response of a single filter and of two cascaded filters. FIG. 13a illustrates the response in output power versus frequency when the filter is tuned with a resonant carrier frequency of 1.94 GHz. FIG. 13b illustrates the two cascaded filter response of output power versus frequency when each filter is tuned to 1.94 GHz. The results in FIG. 13 were obtained from experimental data using filters having a core diameter of 760 $\mu$m and a cladding thickness of 76 $\mu$m. The optical carrier frequency was provided from a GaAs laser diode having a wavelength of 0.84 $\mu$m. In the comparison of FIGS. 13a and 13b it can be seen that a sharper attenuation i.e. narrower passband is achieved with the cascaded filters. Although illustrated with two cascaded filters, it is envisioned that multiple cascaded filters in excess of two may be implemented to attain a sharper roll off in the attenuation characteristics of the filters.

Utilization of the optical bandpass filters as described herein in a system of present invention permits the construction of an exemplary sixty-four channel system utilizing sixty-four carrier frequencies with FM modulation. For optimum performance of this system with competing technologies, it is preferred that the system operates with the carrier frequencies within the range of 250 MHz–2 GHz, with expansion capability up to 10 GHz.

Figure 14A:
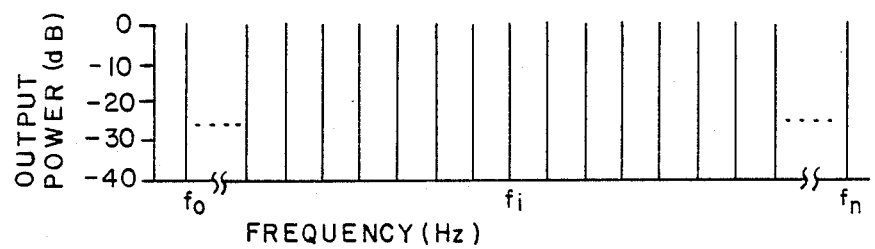
FIGS. 14(a)-(c) are graphs of the signal power as a function of RF carrier frequency for unfiltered and filtered RF signals.
Figure 14B:
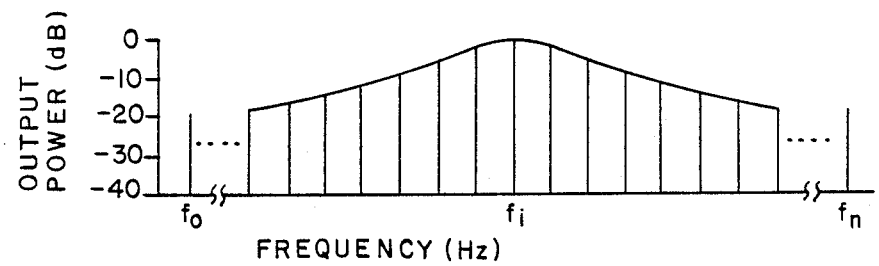

FIG. 14a provides a graphical representation of the output power as input to one of the sixty-four filters. FIG. 14b illustrates the output power, at the output of the filter centered at $F_i$. Without the filtering provided by the optical bandpass filter, the peak signal voltage at the output of the detector would be sixty-four times the single channel peak signal voltage. Under the assumption that channels beyond $F_i+7$ and $F_i-7$ are down 20 db, the peak signal voltage after filtering is merely 10.4 times the single channel peak signal voltage. This corresponds to an improvement with the filtering in the signal to noise ratio of 15.7 db. In addition, by utilizing the optical data bus the output RF signals will be electrically isolated from the input RF signals.

Figure 14C:
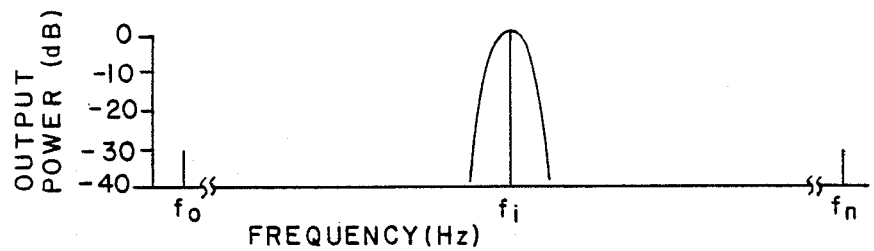

FIG. 14c illustrates the filter response necessary for signals such as high quality video signals. To obtain a narrowband filter response requires the cascading of multiple filters. FIG. 14c illustrates the characteristics of greater attenuation with the further deviation from the carrier frequency as compared to FIG. 14b. Such attenuation is needed for high quality video provided by a single channel having a 6 MHz bandwidth or 150 megabytes digitized bandwidth.

The previous description of the preferred embodiments are provided to enable any person skilled in the art to make or use the present invention. Various modifications to these embodiments will be readily apparent to those skilled in the art, and the generic principles defined herein may be applied to other embodiments. without the use of the inventive faculty. Thus, the present invention is not intended to be limited to the embodiment shown herein, but is to be accorded the widest scope consistent with the principles and novel features disclosed herein.

What is claimed is:

1. A fiber optic data bus for multiplexing, transmitting, and demultiplexing a plurality of input RF signals as a corresponding plurality of output RF signals comprising:

a plurality of modulated light sources, each having an input adapted to receive a respective one of a plurality of input electrical RF signals each at a different RF carrier frequency wherein each modulated light source provides in response to a respective one of said input RF signals at an output a corresponding intensity modulated optical signal;

signal collection means for combining said plurality of intensity modulated optical signals into a combined optical signal, said signal collection means comprising an input star coupler having an output and a plurality of inputs with each input of said input star coupler connected to a respective output of said plurality of modulated light sources;

conducting means conncted to said signal collection means for conducting said combined optical signal, said conducting means comprising an optical fiber having a pair of ends with one end connected to said input star coupler output;

signal distribution means connected to said conducting means for output distribution of said combined optical signal, said signal distribution means comprising an output star coupler having an input and a plurality of outputs with said input of said output star coupler connected to the other end of said optical fiber;

a plurality of optical bandpass filters each having an input and an output, each optical bandpass filter input connected to a different output of said output star coupler, said optical bandpass filter comprising:

a segment of multimode optical fiber of a predetermined length, $L_i$;

an input mirror on one end of said fiber segment;

means for directing intensity modulated light into said fiber segment; and said fiber segment having a length substantially equal to half the wavelength of the modulation frequency in said fiber segment, with said fiber segment functioning as a resonant cavity and filtered output light exiting through said output mirror;

a plurality of optical detectors each having an input and an output, each optical detector input connected to a different optical bandpass filter output; and wherein each of said optical filters extracts a predetermined portion of the distributed combined optical signal as an output optical signal which has a frequency corresponding to the modulation frequency of a respective one of said input RF signals and wherein each one of said optical detectors converts a respective output optical signal to an output electrical RF signal.

2. The fiber optic data bus of claim 1 wherein each RF input signal contains information within a predetermined bandwidth centered about an RF carrier of a different predetermined frequency.

3. The fiber optic data bus of claim 1 wherein each one of said modulated light sources comprises a laser diode each having an input adapted to receive a different one of said input RF signals and an output coupled to a respective input of said input star coupler.

4. The fiber optic data bus of claim 1 wherein said plurality of modulated light sources comprises:

a laser; and a plurality of optical modulators each having an optical input coupled to the output of said laser, a modulation input adapted to receive a different one of said input RF signals and an output coupled to a respective input of said input star coupler.

5. The fiber optic data bus of claim 1 wherein each optical filter comprises a plurality of series connected optical bandpass filters each having an input and an output, the output of each optical bandpass filter connected to the input of another optical bandpass filter, wherein the first optical bandpass filter has an input connected to a respective output of said output star coupler, and a last optical bandpass filter has an output connected to a respective one of said optical detectors.

6. The fiber optic data bus of claim 1 wherein each optical filter input and output mirrors are formed of dielectric material deposited on the respective fiber segment ends.

7. The fiber optical data bus of claim 1 wherein each optical filter light directing means comprises a directional coupler having a single mode injection fiber coupled to a respective fiber segment.

8. The fiber optic data bus of claim 1 wherein each optical filter light directing means comprises an axial hole through a respective input mirror and an injecting fiber axially aligned with and closely adjacent said hole.

9. The fiber optic data bus of claim 1 wherein each optical filter fiber segment comprises a core encased by a cladding each of different refractive indexes.

10. The fiber optic data bus of claim 1 wherein in each optical filter the reflectance of the output mirror is less than the reflectance of the input mirror.

11. The optical fiber data bus of claim 6 wherein in each optical filter the reflectance of the output mirror is less than the reflectance of the input mirror.

12. The fiber optic data bus of claim 1 wherein in each optical filter the reflectances of the respective input and output mirrors are equal.

13. The fiber optic data bus of claim 6 wherein in each optical filter the reflectances of the respective input and output mirrors are equal.

14. The fiber optic data bus of claim 1 wherein the length, L, of said filter is given by the relationship $$L = \frac{\lambda}{2} = \frac{c}{2\eta f_c}$$

where $\lambda$ is the wavelength of the modulation frequency, c is the speed of light, $\eta$ is the effective refractive index of said fiber segment, and $f_c$ is the center modulation frequency.

15. The fiber optic data bus of claim 1 further comprising at least one additional optical bandpass filter each having an additional segment of multimode optical fiber with an input mirror and an output mirror on opposite ends of each additional fiber segment, each additional fiber segment having the respective input mirror coupled adjacent to the respective output mirror of another fiber segment with each adjacently coupled input and output mirrors each having an axially aligned hole therethrough, wherein each additional fiber segment has a length equal to said predetermined length, L, and each additional fiber segment functioning as a resonant cavity with the filtered output light exiting through the output mirror of a last additional segment.

* * * * *